United States Patent [19]

Fukaya et al.

[11] Patent Number: 5,596,156
[45] Date of Patent: Jan. 21, 1997

[54] SINTERED BODY FOR HIGH-HARDNESS TOOLS

[75] Inventors: Tomohiro Fukaya; Tetsuo Nakai, both of Itami, Japan

[73] Assignee: Sumitomo Electric Industries, Ltd., Osaka, Japan

[21] Appl. No.: 529,639

[22] Filed: Sep. 18, 1995

[30] Foreign Application Priority Data

Oct. 14, 1994 [JP] Japan ................. 6-275733

[51] Int. Cl.$^6$ ................................................. C22C 29/04
[52] U.S. Cl. ............................................. 75/238; 75/244
[58] Field of Search .................................. 75/238, 244

[56] References Cited

U.S. PATENT DOCUMENTS

| | | | |
|---|---|---|---|
| 4,343,651 | 8/1982 | Yazu et al. | 75/238 |
| 4,693,746 | 9/1987 | Nakai et al. | 75/238 |
| 4,911,756 | 3/1990 | Nakai et al. | 75/238 |
| 5,034,053 | 7/1991 | Nakai et al. | 75/238 |
| 5,041,399 | 8/1991 | Fukaya et al. | 501/87 |
| 5,092,920 | 3/1992 | Nakai et al. | 75/238 |

FOREIGN PATENT DOCUMENTS

| | | |
|---|---|---|
| 0228693 | 7/1987 | European Pat. Off. . |
| 0228715 | 7/1987 | European Pat. Off. . |
| 0373609 | 6/1990 | European Pat. Off. . |
| 0386338 | 9/1990 | European Pat. Off. . |
| 0430100 | 6/1991 | European Pat. Off. . |

*Primary Examiner*—Ngoclan Mai
*Attorney, Agent, or Firm*—Wenderoth, Lind & Ponack

[57] ABSTRACT

The invention provides a sintered body for high-hardness tools which, when used for cutting work of cast irons where the cutting edge undergoes high temperature and abrupt impact, holds high chip-off and abrasion resistances and exhibits good cutting performance. The sintered body for high-hardness tools is obtained by sintering 60 to 75% by volume of cubic boron nitride powder and remaining part of a binder powder under a superhigh pressure, the binder comprising 5 to 15% by weight of Al, and the remaining part comprising a compound represented by $(Hf_xTi_yM_{1-x-y})(C_zN_{1-z})_\alpha$ (where M denotes an element belonging to IVa, Va or VIa group in the periodic table except Ti and Hf, and where $0.1 \leq x \leq 0.5$, $0.5 \leq y \leq 0.9$, $0.7 \leq z \leq 0.9$, and $0.6 \leq \alpha \leq 0.8$) or a mixture of a plurality of compounds that totally results in the aforementioned composition.

2 Claims, 1 Drawing Sheet

SINTERED BODY FOR HIGH-HARDNESS TOOLS

BACKGROUND OF THE INVENTION

1. Field of the Invention

The present invention relates to a sintered body for high-hardness tools using cubic boron nitride (abbreviated as cBN hereinafter).

2. Description of the Prior Art cBN has a hardness next to diamond, and its sintered bodies are used for various types of cutting tools.

As an example of cBN sintered bodies suitable for cutting tools, Japanese Patent Laid-Open Publication SHO 62-228450 discloses a sintered body which is obtained by sintering 65 to 75% by volume of cBN powder and the remaining part of a binder under a superhigh pressure, wherein the binder comprises 25 to 50% by weight of Al and carbide or carbide-nitride of Ti, and the sintered body obtained has good chip-off resistance in the intermittent cutting of hardened steels and other like processes.

Japanese Patent Laid-Open Publication HEI 3-170638 discloses a sintered body for high-hardness tools, which is obtained by sintering 45 to 75% by volume of cBN powder and the remaining part of a binder under a superhigh pressure, wherein the binder comprises 5 to 25% by weight of Al and the remaining part comprises at least one of the compounds represented by $(Hf_{1-z}M_z)C$ (where M denotes an element belonging to IVa, Va or VIa group in the periodic table except Hf, and where $0 \leq Z \leq 0.3$), and the sintered body obtained exhibits good abrasion and chip-off resistances in the processing of cast irons.

SUMMARY OF THE INVENTION

However, even these sintered bodies have had the following problem. That is, when used for cutting cast irons where the temperature at the cutting edge increases and severe impacts are applied to the edge, the sintered body disclosed in Japanese Patent Laid-Open Publication SHO 62-228450 lacks in heat resistance while the sintered body disclosed in Japanese Patent Laid-Open Publication HEI 3-170638 is indeed good at abrasion resistance but lacks in chip-off resistance, such that the cutting edge may be chipped off, resulting in short service life.

In view of these and other problems of the prior art, an object of the present invention is to provide a sintered body for high-hardness tools, which has better chip-off and abrasion resistances and which exhibits an excellent cutting performance in the processing of cast irons.

To attain the above object, the present invention provides a sintered body for high-hardness tools, which is obtained by sintering 60 to 75% by volume of cubic boron nitride powder and remaining part of a binder powder under a superhigh pressure, the binder comprising 5 to 15% by weight of Al, and the remaining part comprising a compound represented by $(Hf_xTi_yM_{1-x-y})(C_zN_{1-z})_\alpha$ (where M denotes an element belonging to IVa, Va or VIa group in the periodic table except Ti and Hf, and where $0.1 \leq x \leq 0.5$, $0.5 \leq y \leq 0.9$, $0.7 \leq z \leq 0.9$, and $0.6 \leq \alpha \leq 0.8$) or a mixture of a plurality of compounds that totally results in the aforementioned composition, wherein the mean particle size of the binder is 1 μm or less.

Deterioration of tools in cutting cast irons is caused by the occurrence of chipping-off due to an impact applied to the cutting edge, as well as crater abrasion that easily develops by temperature increase at the cutting edge. Therefore, characteristics required for the sintered body are high strength together with good heat resistance.

The reason why the sintered body for high-hardness tools according to the present invention is excellent in these characteristics can be deduced as follows.

In the sintered body according to the present invention, during a sintering process under a superhigh pressure, Al contained in the binder and a compound represented by the remaining part $(Hf_xTi_yM_{1-x-y})(C_zN_{1-z})_\alpha$ (where M denotes an element belonging to IVa, Va or VIa group in the periodic table except Ti and Hf, and where $0.1 \leq x \leq 0.5$, $0.5 \leq y \leq 0.9$, $0.7 \leq z \leq 0.9$ and $0.6 \leq \alpha \leq 0.8$), or a mixture of a plurality of compounds that totally results in the aforementioned composition react with cBN particles having an excellent hardness at high temperature, thereby forming boride or nitride of aluminum, or boride of Hf and Ti. It is inferred that these reaction products tightly bind particles composing the sintered body of cBN and the binder so as to enhance the strength of the sintered body, and that nitrogen atoms in $(Hf_xTi_yM_{1-x-y})(C_zN_{1-z})_\alpha$ are dispersed and dissolved into the binding phase in the solid state so as to enhance the tenacity of the sintered body while HfC excellent in heat resistance enhances the heat resistance of the sintered body.

Although a small quantity of aluminum was confirmed to exist as aluminum oxide in the sintered body by X-ray diffraction, it does not affect the function of the present invention at all.

The binder may be either a solid solution having the aforementioned composition, or a mixture of a plurality of compounds that totally results in the aforementioned composition. When the binder is a solid solution, the performance of the sintered body is stabilized because of its highly homogeneous texture. When the binder is a mixture of a plurality of compounds that totally results in the aforementioned composition, on the other hand, the production cost of the sintered body is lower than that of solid solutions, preferably in terms of industrial application.

When the amount of Al contained in the binder is less than 5% by weight, the amount of reaction products with cBN is decreased so that the strength of the sintered body would be deteriorated. When it is over 15% by weight, boride of Al and the like is formed in larger amounts so that the strength of the sintered body would be enhanced. However, its abrasion resistance is deteriorated due to its insufficient heat resistance as is seen in the sintered body disclosed in Japanese Patent Laid-Open Publication SHO 62-228450.

In $(Hf_xTi_yM_{1-x-y})(C_zN_{1-z})_\alpha$, Hf has an effect to increase the heat resistance of the sintered body while Ti has an effect to enhance the strength of the sintered body by virtue of its high reactivity with cBN.

When the value of x is less than 0.1, the amount of Hf described above is so small that heat resistance of the sintered body decreases. Conversely, when the value is more than 0.5, the amount of Ti becomes relatively so small that strength of the sintered body decreases.

When the value of y is less than 0.5, the amount of Ti is so small that strength of the sintered body decreases. When the value is more than 0.9, the amount of Hf becomes relatively so small that heat resistance of the sintered body decreases.

When the value of z is more than 0.9, the solubilized amount of nitrogen atoms in the solid state is so small that the effect of enhancing tenacity of the sintered body is lost so that its chip-off resistance decreases as is seen in the sintered body disclosed in Japanese Patent Laid-Open Publication HEI 3-170638. When the value is less than 0.7, the amount of carbides of Hf and the like having good heat resistance decreases, resulting in decreased heat resistance of the sintered body.

When the value of a is less than 0.6, the amount of metallic components in the binder becomes so large that the binder becomes difficult to crash and results in a powder having a mean particle size of 1 μm or more, with decreased strength of the sintered body. When the value is more than 0.8, the amount of Ti and the like involved in the reaction with cBN becomes small, thereby decreasing the strength of the sintered body.

The blending amount of cBN powder is required to be in the range of 60 to 75% by volume. When the ratio is less than 60% by volume, hardness of the sintered body at high temperatures decreases. When the ratio is more than 75% by volume, the hardness at high temperatures indeed increases but the amount of the binders that are excellent in heat resistance and binding strength decreases relatively so that the characteristics of the sintered body decrease.

DETAILED DESCRIPTION OF THE PREFERRED EMBODIMENTS

Figure 1:
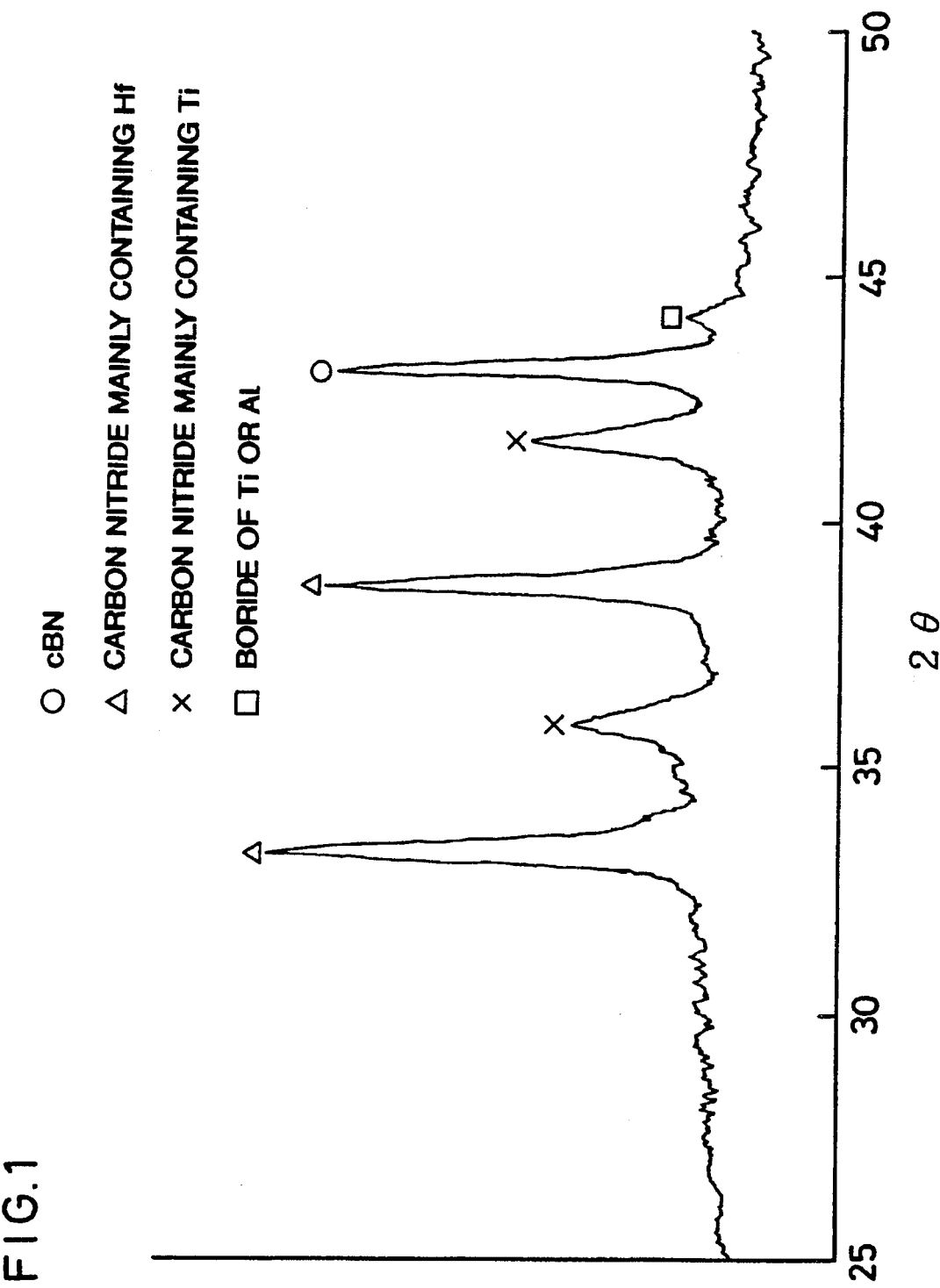
FIG. 1 is a chart showing X-ray diffraction results of the sintered body according to the present invention.

The present invention is further described based on examples thereof.

A binder represented by 86% by weight of $(Hf_{0.2}Ti_{0.75}W_{0.05})(C_{0.85}N_{0.15})_{0.7}$–14% by weight of Al was crashed into a powder having a mean particle size of 1 μm or less by using an extra-hard pot and balls. The powder was mixed with cBN powder in mixing ratios listed in Table 1, placed in a vessel made of Mo and subjected to degassing for 30 minutes at $10^{-4}$ torr and 1000° C. in a vacuum furnace and thereafter sintered at a superhigh pressure under the conditions of 52 kb and 1300° C.

An identification of sintered bodies obtained by X-ray diffraction showed peaks of cBN, as well as those of carbon-nitride containing Hf and Ti, boride of Ti, boride of Hf, boride of Al and nitride of Al in all the sintered bodies.

Each sintered body was then formed into a chip for cutting work and an intermittent cutting test in FCD45 (hardness: HB=180) was carried out by using the chip. The cutting conditions were: cutting speed 250 m/min., cutting depth 0.22 mm, feed length 0.6 m/rev., and wet cutting. The results are listed also in Table 1.

TABLE 1

| No. | cBN powder | Binder | Chip-off life time (minutes) |
| --- | --- | --- | --- |
| 1 | 60 | 40 | 203 |
| 2 | 65 | 35 | 215 |
| 3 | 70 | 30 | 223 |
| 4 | 50 | 50 | 23 |
| 5 | 80 | 20 | 50 |

*The numerals in the columns of cBN powder and binder are represented in % by volume.
*Nos. 4 and 5 are comparative examples and underlined numerals indicate that they are out of the scope of the claims of the present invention.

A mixture of a plurality of compounds (e.g., Ti, TiC, TiN, HfC, WC and Al) that totally results in the same composition that of the binder in Example 1 was crushed into a powder having a mean particle size of 1 μm or less by using an extra-hard pot and balls. This mixture was mixed with cBN powder in a mixing ratio of No. 2 of Table 1 in Example 1. The resultant mixture was placed in a vessel made of Mo and subjected to degassing in a vacuum furnace at $10^{-4}$ torr and 1000° C. for 30 minutes and thereafter sintered at a superhigh pressure under the conditions of 52 kb and 1300° C.

An identification of sintered bodies obtained by X-ray diffraction showed peaks of cBN, as well as those of carbide-nitride mainly containing Hf, carbide-nitride mainly containing Ti, and boride of Ti and Al.

The sintered bodies obtained were formed into a chip for cutting work and an intermittent cutting test was carried out in the same conditions as in Example 1. As a result, the chip-off life time was 225 minutes, by which performance nearly equivalent to that of No. 2 of Table 1 of Example 1 was confirmed.

65% by volume of cBN powder was mixed with 35% by volume of binders having compositions of Table 2. The resultant mixture was placed in a vessel made of Mo and subjected to degassing in a vacuum furnace at $10^{-4}$ torr and 1000° C. for 20 minutes and thereafter sintered at a superhigh pressure under the conditions of 50 kb and 1350° C.

An observation of sintered bodies obtained with a scanning type microscope showed that cBN particles were bound together via the binders.

Each sintered body was then formed into a chip for cutting work and an intermittent cutting test in FCD50 (hardness: HB=220) was carried out by using the chip. The cutting conditions were: cutting speed 210 m/min., cutting depth 0.21 mm, feed length 0.11 m/rev., and wet cutting. The results are listed also in Table 2.

TABLE 2

| No. | Binder | Chip-off Life Time (min.) |
| --- | --- | --- |
| 1 | 94 $(Hf_{0.15}Ti_{0.75}Ta_{0.1})(C_{0.75}N_{0.25})_{0.7}$ - 6Al | 125 |
| 2 | 88 $(Hf_{0.2}Ti_{0.75}W_{0.05})(C_{0.85}N_{0.15})_{0.65}$ - 12Al | 132 |
| 3 | 86 $(Hf_{0.4}Ti_{0.55}Ta_{0.05})(C_{0.88}N_{0.12})_{0.8}$ - 14Al | 168 |
| 4 | 85 $(Hf_{0.05}Ti_{0.8}W_{0.15})(C_{0.8}N_{0.2})_{0.75}$ - 15Al | 35 |
| 5 | 87 $(Hf_{0.65}Ti_{0.3}Zr_{0.05})(C_{0.8}N_{0.2})_{0.65}$ - 13Al | 30 |
| 6 | 87 $(Hf_{\underline{0.05}}Ti_{\underline{0.95}})(C_{0.7}N_{0.3})_{0.7}$ - 13Al | 15 |
| 7 | 92 $(Hf_{0.3}Ti_{0.65}Mo_{0.05})(C_{\underline{0.6}}N_{\underline{0.4}})_{0.75}$ - 8Al | 62 |
| 8 | 88 $(Hf_{0.35}Ti_{0.6}V_{0.05})(C_{\underline{0.98}}N_{\underline{0.02}})_{0.7}$ - 12Al | 68 |
| 9 | 91 $(Hf_{0.35}Ti_{0.6}Ta_{0.05})(C_{0.75}N_{0.25})_{\underline{0.5}}$ - 9Al | 53 |
| 10 | 92 $(Hf_{0.2}Ti_{0.6}W_{0.2})(C_{0.8}N_{0.2})_{\underline{0.95}}$ - 8Al | 23 |
| 11 | 97 $(Hf_{0.4}Ti_{0.55}Nb_{0.05})(C_{0.85}N_{0.15})_{0.65}$ - 3Al | 34 |
| 12 | 80 $(Hf_{0.25}Ti_{0.6}V_{0.15})(C_{0.75}N_{0.25})_{0.75}$ - $\underline{20}$Al | 12 |

*The numerals at the heads of the compounds in the table represent their amount in the binder in % by weight.
*The compositions in the table are the composition of a compound, or the total composition of a mixture of a plurality of compounds.
*Nos. 4 through 14 are comparative examples, and underlined numerals indicate that they are out of the scope of the claims of the present invention.

As described above, according to the present invention, the sintered body is superior to the conventional cBN sintered bodies in both chip-off and abrasion resistances. Accordingly, the present invention provides a sintered body for high-hardness tools suitable for the process of cutting cast irons in which the cutting edge undergoes high temperature and abrupt impacts.

What is claimed is:

1. A sintered body for high-hardness tools, which is obtained by sintering 60 to 75% by volume of cubic boron nitride powder and remaining part of a binder powder under a superhigh pressure, the binder comprising 5 to 15% by weight of Al, and the remaining part comprising a compound represented by $(Hf_xTi_yM_{1-x-y})(C_zN_{1-z})_\alpha$ (where M denotes an element belonging to IVa, Va or VIa group in the periodic table except Ti and Hf, and where $0.1 \leq x \leq 0.5$, $0.5 \leq y \leq 0.9$, $0.7 \leq z \leq 0.9$, and $0.6 \leq \alpha \leq 0.8$) or a mixture of a plurality of compounds that totally results in the aforementioned composition.

2. The sintered body for high-hardness tools according to claim 1, wherein a mean particle size of the binder in said sintered body is 1 μm or less.

* * * * *